United States Patent
Quay et al.

(10) Patent No.: US 6,205,151 B1
(45) Date of Patent: *Mar. 20, 2001

(54) ATM CELL SCHEDULER WHICH USES A HEAP MEMORY AND ASSOCIATES TIMESTAMPS WITH EACH CHANNEL

(75) Inventors: Jeffrey R. Quay, Royse City; Brian J. Karguth, Sherman; Sharat Prasad, Plano, all of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/993,801

(22) Filed: Dec. 18, 1997

Related U.S. Application Data

(60) Provisional application No. 60/066,328, filed on Nov. 21, 1997.

(51) Int. Cl.[7] .............................. H04L 12/28; H04L 12/56
(52) U.S. Cl. ............................................. 370/416; 370/395
(58) Field of Search ..................................... 370/395, 232, 370/235, 236, 230, 412, 468, 224, 411, 413–416

(56) References Cited

U.S. PATENT DOCUMENTS

| | | | |
|---|---|---|---|
| 5,796,735 | * | 8/1998 | Miller et al. ........................... 370/395 |
| 5,812,527 | * | 9/1998 | Kline et al. ............................ 370/232 |
| 5,844,890 | * | 12/1998 | Delp et al. ............................. 370/230 |
| 5,917,822 | * | 6/1999 | Lyles et al. ........................... 370/395 |
| 5,926,459 | * | 7/1999 | Lyles et al. ........................... 370/230 |
| 6,006,270 | * | 12/1999 | Kobunaya ............................. 709/233 |
| 6,028,843 | * | 2/2000 | Delp et al. ............................. 370/235 |
| 6,115,360 | * | 9/2000 | Quay et al. ............................ 370/235 |

FOREIGN PATENT DOCUMENTS

| | | |
|---|---|---|
| 0 782 303 | 7/1997 | (EP) . |
| WO 97 42735 | 11/1997 | (WO) . |

* cited by examiner

Primary Examiner—David R. Vincent
(74) Attorney, Agent, or Firm—Wade James Brady, III; Frederick J. Telecky, Jr.

(57) ABSTRACT

A network hub and Asynchronous Transfer Mode (ATM) translator system (5) for use in a Local Area Network (LAN)-based communications system is disclosed. The network hub and ATM translator system (5) includes a host controller (10) that serves as the LAN hub, and which interfaces with a translator card (15) which includes a segmentation and reassembly device (12) in connection with SONET receive/transmit circuitry (20) that communicates with a transceiver (22) to transmit and receive ATM packet cells over a communications facility (FO). The translator card (15) also includes a scheduler (14) that includes a heap sort state machine (36) which maintains a sorted list of entries, in a heap fashion, in on-chip parameter memory (44) and off-chip parameter memory (18). The entries include, for each ATM channel, a channel identifier and a timestamp that indicates the time at which the next cell for the channel will be due for transmission. A due comparator (40) compares the timestamp of the root value in the heap (i.e., the channel with the next due cell) to a global time generated by a reference timer (38), and indicates to a source behavior processor (24) in the scheduler (14) that a cell is due for transmission. The scheduler than issues a transmit credit for the cell, and communicates this event with the SAR device (12) to effect the transmission as appropriate.

16 Claims, 4 Drawing Sheets

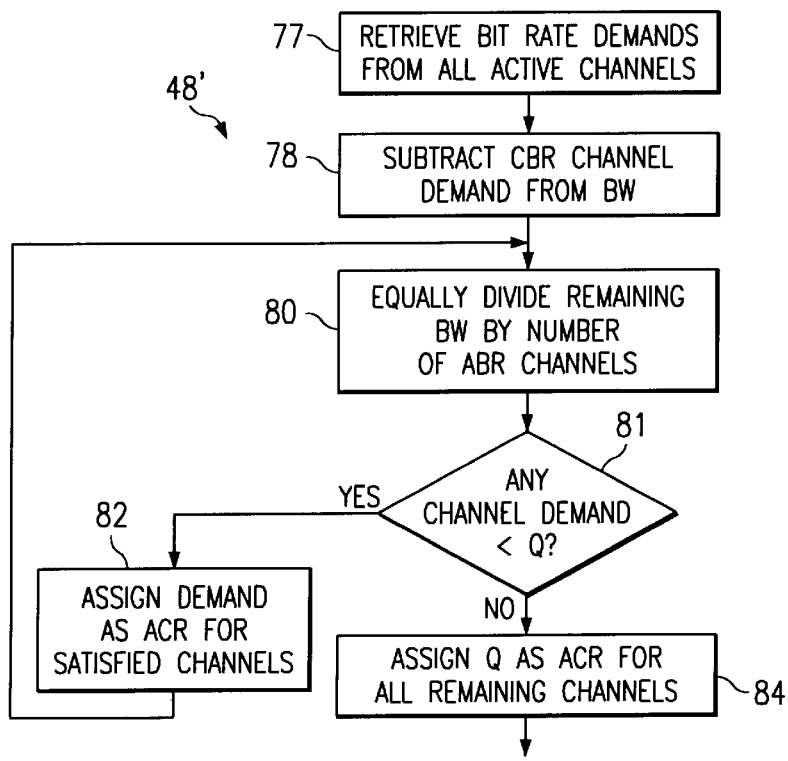
FIG. 5
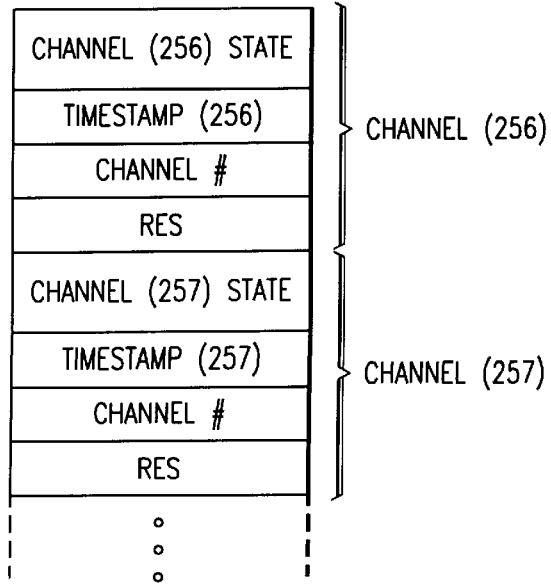
FIG. 6a
FIG. 6b

ATM CELL SCHEDULER WHICH USES A HEAP MEMORY AND ASSOCIATES TIMESTAMPS WITH EACH CHANNEL

CROSS-REFERENCE TO RELATED APPLICATIONS

This application claims the benefit, under 35 U.S.C. §119(e)(1), of U.S. Provisional Application No. 60/066,328, filed Nov. 21, 1997, and incorporated herein by this reference.

This application is also related to commonly-assigned copending application Ser. No. 08/994,332, entitled "Fair Scheduling of ATM Cell Transmissions During Overscheduled Conditions", filed contemporaneously herewith.

STATEMENT REGARDING FEDERALLY SPONSORED RESEARCH OR DEVELOPMENT

Not applicable.

BACKGROUND OF THE INVENTION

This invention is in the field of data communications, and is more specifically directed to asynchronous transfer mode (ATM) data communication.

In the field of digital communications, whether applied to voice, video, or data communication, various communication techniques have been developed for routing messages among nodes, or processors, that are connected over a network. One such approach is referred to as packet switching, in which certain network nodes operate as concentrators to receive portions of messages, referred to as packets, from the sending units. These packets may be stored at the concentrator, and are then routed to a destination concentrator to which the receiving unit indicated by the packet address is coupled. The size of the packet refers to the maximum upper limit of information which can be communicated between concentrators (i.e., between the store and forward nodes), and is typically a portion of a message or file. Each packet includes header information relating to the source network address and destination network address, which permits proper routing of the message packet. Packet switching ensures that routing paths are not unduly dominated by long individual messages, and thus reduces transmission delay in the store-and-forward nodes. Fast packet switching refers to packet switching techniques that operate at high data rates, up to and exceeding hundreds of megabits per second.

A well-known example of a fast packet switching protocol, which combines the efficiency of packet switching with the predictability of circuit switching, is Asynchronous Transfer Mode (generally referred to as "ATM"), in which packet lengths and organization are fixed, regardless of message length or data type (i.e., voice, data, or video). The fixed packets according to the ATM protocol are referred to as "cells", and each ATM cell is composed of fifty-three bytes, five of which are dedicated to the header and the remaining forty-eight of which serve as the payload. According to this protocol, larger packets are made up of a number of fixed-length ATM cells. The fixed-size cell format enables ATM cell switching to be implemented in hardware, as opposed to software, resulting in transmission speeds in the gigabits-per-second range. In addition, the switching of cells rather than packets permits scalable user access to the network, from a few Mbps to several Gbps, as appropriate to the application. The asynchronous nature of the transmission permits ATM cells to be used in transmitting delay-tolerant data traffic intermixed with time-sensitive traffic like voice and video over the same backbone facility. To more efficiently utilize the bandwidth for these various applications, traffic management techniques are now employed which give priority to time-sensitive traffic relative to delay-tolerant traffic.

Recently, closed loop traffic management schemes have been developed for use in ATM data communication. Closed loop traffic management involves the use of feedback signals between two network nodes to govern the data rates of channels, with a goal of improving the efficiency of bandwidth utilization. This efficiency improvement is particularly necessary when communication of real-time voice and video information is involved, as the time-criticality of these channels can be disturbed by the transmission of large bursts of non-time-critical data.

Current traffic management schemes utilize various transmission categories to assign bandwidth in ATM communications. One high priority category is Constant Bit Rate (CBR), in which the transmission is carried out at a constant rate. Two categories of Variable Bit Rate (VBR) transmission are also provided, one for real-time data and another for non-real-time data. A low priority category is Unscheduled Bit Rate (UBR), in which data is transmitted by the source with no guarantee of transmission speed.

A relatively recent traffic management category is referred to as Available Bit Rate (ABR). In this category, feedback from the receiving network node, via Resource Management (RM) cells or by way of explicit flow control indications in data cells, is used by the source network node to dynamically control its transmission rate in response to current network conditions. This control is effected within certain transmission parameters that are specified upon opening of the transmission channel. Typically, the source and destination nodes agree upon the Peak Cell Rate (PCR) and Minimum Cell Rate (MCR), setting the upper and lower bounds of transmission for an ABR communication. Once these bounds are established, a flow control algorithm is executed, typically at the destination network node, to define the desired transmission rate for each channel. As is known in the art, thousands of connections may be simultaneously open between a given pair of network nodes. As such, traffic management can be a relatively complex operation, especially in controlling ABR category communications.

At the source network node, Segmentation and Reassembly (SAR) devices or operations are used to arrange and transmit ATM cells according to the desired bit rate established by the flow control algorithm. Conventional SAR devices often include "traffic shaper" functions, often known as "leaky buckets", as they include buffers that can rapidly fill up with cell data during bursts, but steadily "leak" or transmit data over the network. The complexity of scheduling transmission from these buffers increases dramatically with the number of channels being handled, and particularly when ABR communications are involved.

As an alternative to the leaky bucket approach, some conventional source node SAR devices are implemented by way of high-performance microprocessors, programmed to handle the scheduling of ATM cells among many channels. However, the use of such microprocessors, typically implemented as a RISC coprocessor, can be quite substantial, especially when considering the substantial amount of external memory that is required for storing programs, caching transmission data, and for providing bus interface functions. For example, the provision of a buffer for storing a number of transmission cells for each of 2048 channels, along with a counter dedicated to each channel that counts the number of cycles since the last transmission for that channel (used to determine when the next cell may be transmitted), requires a very large memory resource for this function.

BRIEF SUMMARY OF THE INVENTION

It is therefore an object of the present invention to provide an efficient scheduling function for Available Bit Rate (ABR) Asynchronous Transfer Mode (ATM) transmissions.

It is a further object of the present invention to provide such a scheduling function that can be implemented with modest memory requirements.

Other objects and advantages of the present invention will be apparent to those of ordinary skill in the art having reference to the following specification together with its drawings.

The present invention may be implemented into a translation system for communicating messages from a Local Area Network (LAN) to ATM transmissions. The translation system includes a Segmentation and Reassembly (SAR) function that operates in combination with an ABR scheduling function. The ABR scheduler includes circuitry for maintaining a heap data structure, in which each entry includes a channel identifier associated with a timestamp. The timestamp is a timer value that indicates the next time at which a cell for the associated channel is to be transmitted. A heap sort process is executed so that a root element in the heap data structure corresponds to the next cell to be scheduled for transmission. According to one aspect of the present invention, the heap data structure may be stored in an on-chip memory resource and external memory, where the most recent heap sort results are stored on-chip.

BRIEF DESCRIPTION OF THE SEVERAL VIEWS OF THE DRAWING

FIG. 5 is a flow diagram illustrating the operation of the source behavior processor in the scheduler of FIG. 3 in adjusting the allowed cell rate values for ATM channels, according to the preferred embodiment of the invention.

FIGS. 6a and 6b are memory maps illustrating the arrangement of on-chip and off-chip parameter memory, respectively, in the network hub and ATM translator of FIG. 2, according to the preferred embodiment of the invention.

DETAILED DESCRIPTION OF THE INVENTION

Figure 1:
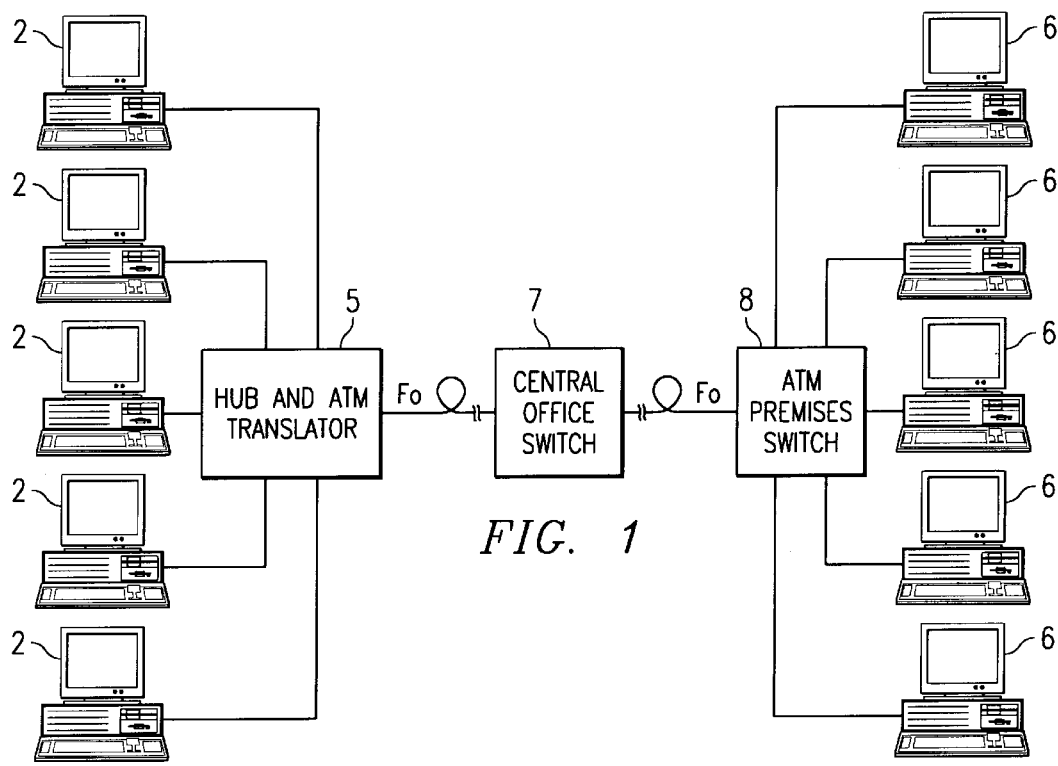
FIG. 1 is an electrical diagram, in block form, of a communications system incorporating the preferred embodiment of the present invention.

Referring first to FIG. 1, an example of a communications system within which the present invention may be implemented will now be illustrated by way of example. The example of FIG. 1, as will become apparent from the following description, relates to the way in which data processing devices, such as computers in a Local Area Network (LAN), communicate with other data processing devices by way of Asynchronous Transfer Mode (ATM) communications; these other data processing devices may themselves be computers in a different LAN, or stand-alone computers, or other systems with which the desired communications are to be carried out. It will be understood by those in the art, having reference to this description, that the present invention may be implemented in communications systems of different architecture from that shown in FIG. 1, the system of FIG. 1 being provided herein simply by way of example. It is contemplated that such other implementations are also within the scope of the present invention.

As illustrated in FIG. 1, the exemplary communications system effects communication between one of computers 2, arranged in a LAN, to one of computers 6 at a remote location. Computers 2 in this example are arranged in a LAN of the Ethernet type, such that each computer 2 is in communication with network hub and ATM translator 5; of course, computers 2 may alternatively be arranged in a token-ring LAN or other LAN type. In an Ethernet LAN, as many as 2048 separate communications channels may be established, under the control of network hub and ATM translator 5. Network hub and ATM translator 5, the construction and operation of which will be described in further detail hereinbelow, is connected to fiber optic facility FO, so that communications to and from one of computers 2, from another computer outside of the LAN, may be carried out. Fiber optic facility FO, is received by one or more of a network of central office switches 7, which makes the connection between network hub and ATM translator 5 and the destination specified in the communication.

In this example, computers 6 are located at a remote location. In this example, remote computers 6 are each connected to ATM premises switch 8. ATM premises switch 8 enables ATM communication among computers 6 in workgroups or departments. In this example, ATM premises switch 8 is also connected to an external fiber optic facility FO, such that computers 6 in its local ATM workgroup may also communicate ATM messages to destinations outside of the workgroup. No translation is carried out by ATM premises switch 8, as it handles only ATM communications (whether over fiber optic facility FO or within the workgroup of computers 6). Alternatively, if computers 6 are also arranged in a LAN, another instance of network hub and ATM translator 5 would be implemented in place of ATM premises switch 8, the arrangement of computers 6 in FIG. 1 being presented by way of example only.

As noted above, network hub and ATM translator 5 interfaces both to computers 2 over the Ethernet LAN, and also to fiber optic facility FO for ATM communications. As such, network hub and ATM translator 5, in addition to its hub management functions, must also translate the Ethernet packets, which are about 1,500 bytes in length, into fixed-length ATM cells for communications from computers 2 over fiber optic facility FO, and vice versa for received communications.

Figure 2:
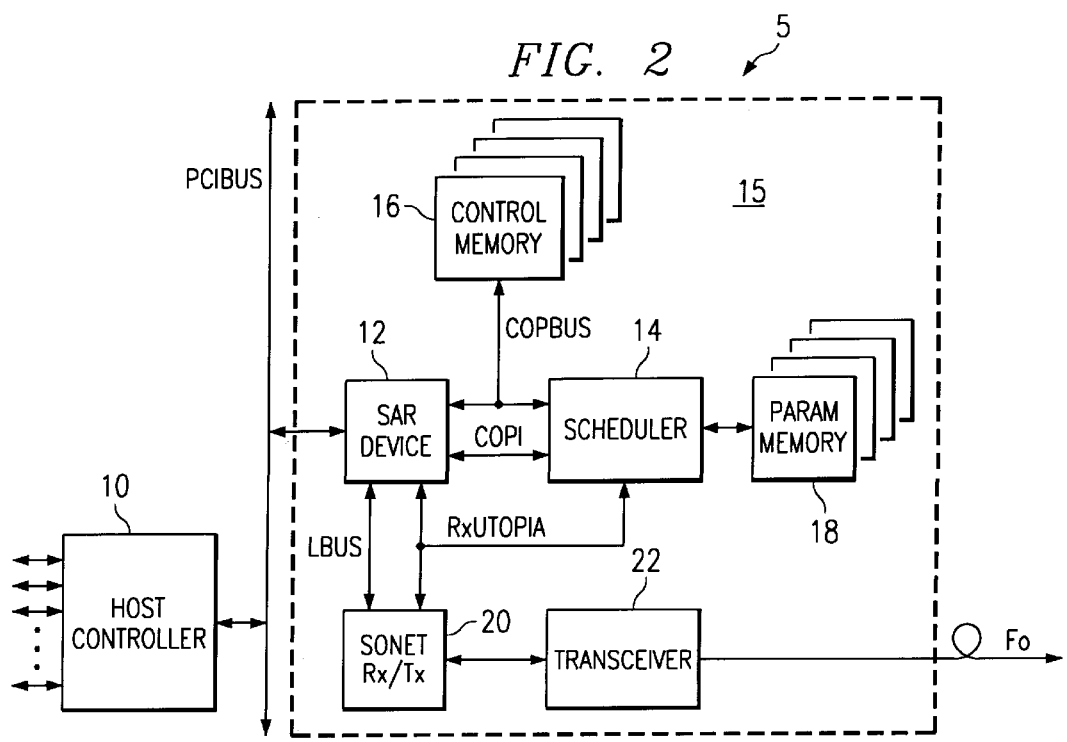
FIG. 2 is an electrical diagram, in block form, of a network hub and Asynchronous Transfer Mode (ATM) translator in the system of FIG. 1, according to the preferred embodiment of the invention.

Referring now to FIG. 2, the construction of network hub and ATM translator 5 according to the preferred embodiment of the invention will now be described. According to this embodiment of the invention, network hub and ATM translator 5 includes host controller 10, which is a conventional computer workstation for handling the Ethernet hub functions for Ethernet communications from computers 2; as such, it is contemplated that host controller 10 will have sufficient performance capability to operate in this server capacity. In this example, host controller 10 includes, along with its data processing functionality, high-performance local bus PCIBUS which operates according to the well-known PCI bus standard. In combination with host controller 10, network hub and ATM translator 5 includes translator card 15 which interfaces with local bus PCIBUS and which includes circuitry for performing LAN to ATM translation and for interfacing to fiber optic facility FO as shown. As such, host controller 10 includes the necessary functionality for recognizing those communications from one of computers 2 that are intended for a remote destination, and for forwarding these communications to translator card 15 over local bus PCIBUS.

Translator card 15 includes SAR device 12, which performs segmentation and reassembly functions for the communications handled by translator card 15, and as such is connected to local bus PCIBUS of host controller 10. An example of a suitable SAR device 12 for use in connection with the preferred embodiment of the invention is the TNETA 1575 ATM Segmentation and Reassembly Device available from Texas Instruments Incorporated (the assignee of the present invention). SAR device 12 is connected, via local bus LBUS, to SONET receive/transmit circuitry 20 which encodes and decodes the communications according to the well-known SONET standard. SONET receive/transmit (Rx/Tx) circuitry 20 is in turn connected to transceiver 22, which drives signals onto fiber optic facility FO and receives signals therefrom, in the conventional manner.

Translator card 15 in network hub and ATM translator 5 according to the preferred embodiment of the invention includes scheduler 14, which is connected to SAR device 12 and to control memory 16 by way of coprocessor bus COPBUS. According to the preferred embodiment of the present invention, scheduler 14 is implemented into a single integrated circuit device. Control memory 16 includes a configuration space that can be accessed by system software, and which provides configuration, initialization, and error handling functionality. Scheduler 14 is also connected to SAR device 12 via control bus COPI, by way of which a clock is provided to scheduler 14 for synchronization; control bus COPI also carries control signals for indicating to scheduler 14 that an ATM cell has been received or sent, a control signal serving as a reset signal to scheduler 14, and signals from scheduler 14 to SAR device 12 concerning the status of FIFO resources and for providing an interrupt thereto. Scheduler 14 also receives signals over bus RXUTOPIA, which corresponds to lines in a conventional Universal Test and Operations Physical Interface for ATM (UTOPIA) bus protocol; scheduler 14 operates only as an observer over lines RXUTOPIA, so that it is aware of the receipt of incoming ATM cells.

Scheduler 14 is also connected to parameter memory 18. Parameter memory 18 is a memory resource, off-chip from scheduler 14, for storing information regarding each of the Ethernet channels handled by network hub and ATM translator 5. This parameter memory 18 stores indicators, for each of the channels, regarding the various cell rates at which communications for that channel are to be carried out, as well as channel identifiers such as the Virtual Path Identifier (VPI) or Virtual Channel Identifier (VCI) for that channel. According to the preferred embodiment of the present invention, parameter memory 18 also stores, for some of the channels, timestamp offset and base values associated with each Ethernet channel, with the value of the timestamp indicating the time at which the next cell for that channel is to be processed for communication over fiber optic facility FO. In this embodiment of the invention, parameter memory 18 may include on the order of 64k thirty-two bit words.

Figure 3:
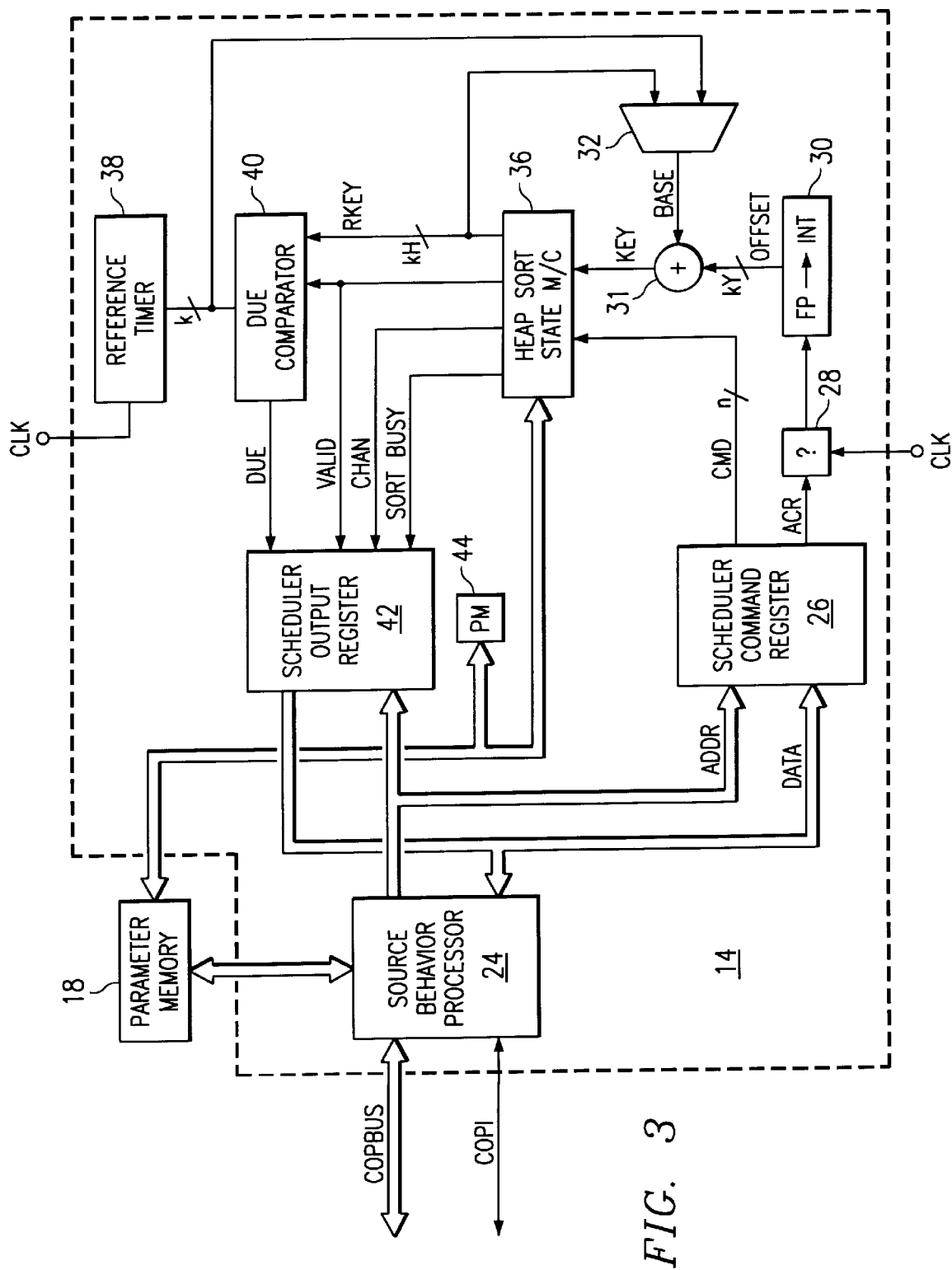
FIG. 3 is an electrical diagram, in block form, of the scheduler in the network hub and ATM translator of FIG. 2, according to the preferred embodiment of the invention.

Referring now to FIG. 3, the construction of the portion of scheduler 14 for performing source operations, according to the preferred embodiment of the present invention, will now be described in detail. In addition to the portion of scheduler 14 which is illustrated in FIG. 3, scheduler 14 also includes destination processing circuitry for monitoring the receipt of cells over the UTOPIA interface (i.e., over bus RXUTOPIA), in either an ATM mode or a PHY mode, as selected by a control signal. In ATM mode, this receive side of scheduler 14 will receive the incoming cells and transfer them into the reassembly interface of SAR device 12; in PHY mode, the receive side of scheduler 14 will behave as a TX UTOPIA of a PHY device, and monitor the incoming cells as they are applied by the switching element into the reassembly interface of SAR device 12.

In the source side of scheduler 14 as shown in FIG. 3, source behavior processor 24 constitutes the primary operational logic of scheduler 14 for scheduling the transmission of ATM cells over fiber optic facility FO, as will be described in detail hereinbelow. Source behavior processor 14 implements Available Bit Rate (ABR) transmissions, and as such is responsible for communicating with SAR device 12 over coprocessor bus COPBUS according to control signals on bus COPI, and for providing high-level control over the other functions in scheduler 14. Source behavior processor 24 interfaces with external parameter memory 18, as does heap sort state machine 36.

As will be described in further detail hereinbelow, heap sort state machine 36 interfaces both with external parameter memory 18 and also with on-chip parameter memory 44. As will become apparent from the following description, on-chip parameter memory 44 will contain timestamp information regarding those ATM cells which are next due for transmission (e.g., the next 256 ATM cells to be transmitted), while off-chip parameter memory 18 will contain both the transmission parameters used by source behavior processor 24 for all cells, and also timestamp information regarding the remaining ATM cells (e.g., ATM cells 256 through 2047 in the current transmission queue). This arrangement of on-chip parameter memory 44 and off-chip parameter memory 18 is beneficial in the performance of scheduler 14 and SAR device 12, considering that the on-chip memory is typically faster to access, and is also beneficial in that the number of LAN channels to be scheduled by scheduler 14 is easily scaled simply by increasing the size of off-chip parameter memory 18.

Internally within scheduler 14, source behavior processor 24 presents address information on address bus ADDR, and bidirectionally communicates data on data bus DATA. Scheduler command register 26 is connected to buses ADDR, DATA, and handles communications from source behavior processor 24 which concern the queuing of a new ATM cell into the transmission queue, including the determination of the time at which the cell is to be declared as due and scheduled for transmission. Scheduler command register 26 receives such commands from source behavior processor 24, and forwards command signals to heap sort state machine 36, as well as an allowed cell rate value on lines ACR to divider 28.

The circuitry for determining a timestamp for each new ATM cell to be scheduled for transmission includes divider 28, which receives the allowed cell rate value for the cell on lines ACR from scheduler command register 26, and which also receives a clock signal on line CLK. While not shown in FIG. 3, the clock signal on line CLK is also applied to other synchronous circuitry in scheduler 14, as all synchronous operations performed by scheduler 14 are preferably based on this clock signal. In general, divider 28 generates a value that corresponds to the number of cycles of the clock signal on line CLK, which constitutes the period for the allowed cell rate value communicated on line ACR, and applies this period value to floating-point-to-integer circuit 30, which converts this period value into an integer value and generates a signal on lines OFFSET to adder 31. The value of the signal on lines OFFSET corresponds to the number of cycles of the clock signal on line CLK that are to elapse before the cell is issued a "transmit credit" (i.e., scheduled for transmission). A more detailed description of this operation will be provided hereinbelow.

The value on lines OFFSET are added, by adder 31, to the value of the signal on lines BASE that are received from multiplexer 32; multiplexer 32 receives one input from the output of heap sort machine 36 on lines RKEY, corresponding to a root key value which is the time at which the channel last matured, and another input from reference timer 38, corresponding to the current value of the timer against which cell timestamps are compared by due comparator 40. A control input to multiplexer 32 is generated by multiplexer control function 33, which also receives the output of heap sort state machine 36 on lines RKEY and the current global time from reference timer 38, plus the offset value on lines OFFSET from floating-point-to-integer circuit 30; the selection made by multiplexer 32 in selecting the base value will be described in further detail hereinbelow. The resulting sum from adder 31 is presented on lines KEY to heap sort state machine 36, as a timestamp (BASE plus OFFSET) for the cell that is to be newly scheduled. As will be described in further detail hereinbelow, heap sort state machine 36 sorts all currently active cells according to their timestamps, establishing the order in which cells are to receive their transmit credits. Control signals from heap sort state machine 36 are provided to scheduler output register 42. These control signals include a signal on line SORTBUSY indicating that heap sort state machine 36 is currently in a sorting process, during which time no new cells are to be forwarded for scheduling by source behavior processor 24. Signals on lines CHAN and VALID indicate the identity of the root cell (i.e., the next "due" cell, as will be discussed below) and its validity, while signals are presented to due comparator 40 on lines RKEY for this channel, communicating its timestamp value.

Reference timer 38 is a simple counter that advances with each cycle of the clock signal on line CLK, and thus serves as the timebase for the scheduling operation. Due comparator 40 receives the output of reference timer 38 along with the timestamp value on lines RKEY from heap sort state machine 36. Upon receiving a VALID signal from heap sort state machine 36 indicating that a root channel has been found as a result of the sort process, due comparator 40 compares the timestamp for the root channel with the current value from reference timer 38 to determine if the time for issuing a transmit credit for this cell has yet occurred and, if so, indicates the same to scheduler output register 42 via line DUE. Scheduler output register 42 handles communications from the sorting circuitry to source behavior processor 24, such communications including indications of channels that have cells for which transmit credits are to be issued, as well as data for updating the parameter memory 18, 44.

Figure 4:
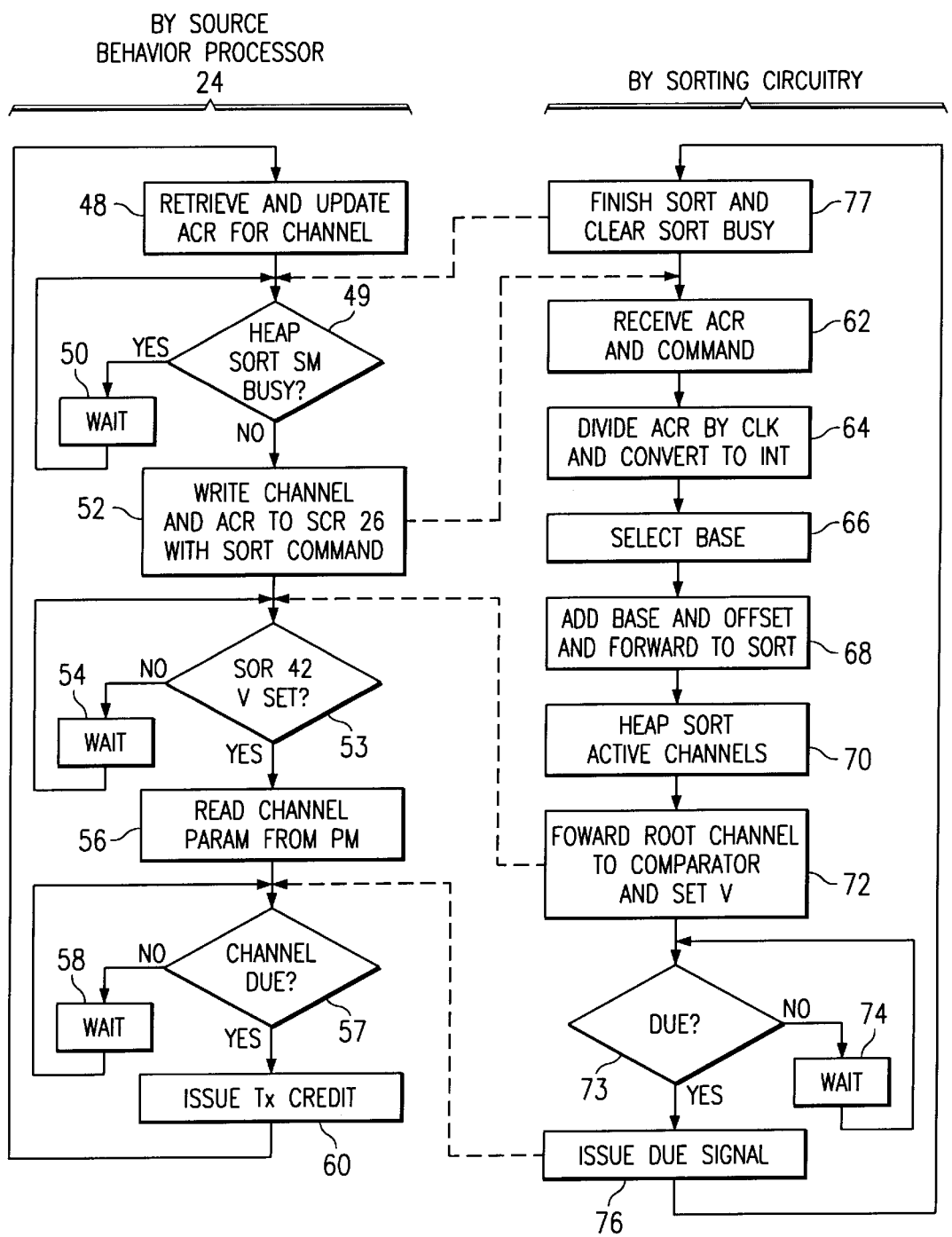
FIG. 4 is a flow diagram illustrating the operation of the scheduler of FIG. 3 according to the preferred embodiment of the invention.

Given this description of the construction of scheduler 14, and its general operation, attention is now directed to FIG. 4, in connection with which the operation of scheduler 14 in scheduling ATM cells for transmission according to the preferred embodiment of the invention will now be described in detail. The operation illustrated in FIG. 4 is considered as performed by source behavior processor 24, on one hand, and by the sorting circuitry in scheduler 14 (heap sort state machine 36 and its associated circuitry described hereinabove), on the other hand. The operation of these two portions of scheduler 14 are carried out in a cooperative manner, and as such the flow diagram of FIG. 4 is illustrated in two portions.

Source behavior processor 24 begins the scheduling operation for an ATM channel (channel $CH_n$) for which it has most recently scheduled a transmit operation. In process 48, source behavior processor 24 retrieves the allowed cell rate (ACR) value for channel $CH_n$ from parameter memory 18 or from SAR device 12, as the case may be, and updates this ACR value as necessary. In this regard, update of the ACR values for active channels in the communications system need not be performed each time that a cell transmission request is received, but only when channel conditions change, such as when an ATM transmission ends or when a new ATM channel is opened. When no conditions have changed, process 48 is performed by source behavior processor 24 simply by retrieving the current ACR value for channel $CH_n$ from parameter memory 18, and by forwarding this value on lines ACR to divider 28.

Source behavior processor 24 next performs decision 49, in which it polls scheduler output register 42 to determine if heap sort state machine 36 is busy executing a sort process. As noted above, this busy state is indicated by heap sort state machine 36 issuing an active signal on control line SORT-BUSY to scheduler output register 42. If heap sort state machine 36 is busy (decision 49 is YES), source behavior processor 24 enters wait state 50 until it is determined that heap sort state machine 36 is not busy, during which time it issues no new command to the sort circuitry. Upon decision 49 determining that heap sort state machine 36 is not busy (decision 49 is NO), control passes to process 52 for the processing of channel $CH_n$.

In process 52, source behavior processor 24 writes, to scheduler command register 26, a channel number and associated ACR value for the current ATM channel $CH_n$. Source behavior processor 24 then enters a wait loop, in which it polls scheduler output register 42 to determine if its valid bit is set (corresponding to an active VALID signal issued by heap sort state machine 36 for the next channel for which an ATM cell becomes due (usually a different channel $CH_m$, as will be described hereinbelow); if not (decision 53 is NO), source behavior processor 24 enters a wait state 54 until this valid bit is set.

Upon scheduler command register 26 receiving the command and ACR value, in process 62, scheduler command register 26 forwards the ACR value to divider 28, for determination of the timestamp for channel $CH_n$ as will now be described. According to this preferred embodiment of the present invention, the ACR rate that is derived by source behavior processor 24 (in the units of cells/second) is converted into a count of cycles of the clock signal on line CLK. In process 64, divider 28 divides the frequency of the clock signal on line CLK by the allowed cell rate value on lines ACR for channel $CH_n$, thus deriving a value representing the period of channel $CH_n$'s cell transmissions, in the units of clock cycles per cell. This value is converted from a floating point value to an integer, by floating-point-to-integer circuitry 30, such that the result of process 64 is an offset value presented on lines OFFSET to adder 31. This offset value corresponds to the number of CLK cycles "in the future" at which time a transmit credit will become due for channel $CH_n$.

According to the preferred embodiment of the invention, this offset value on lines OFFSET is added to a base time to derive the actual timestamp for channel $CH_n$. In process 66, multiplexer 32 is controlled by multiplexer control function 33 to select a base time; the base time is typically the time at which the channel last received a transmission credit. This selection is useful, even though a transmit credit has only recently been issued for channel $CH_n$, considering that the latency time for the above-described process is substantial relative to the cell rate. According to the preferred embodiment of the invention, the base time may also be the current global time (i.e., the output of reference timer 38). The determination of which base time to select by way of multiplexer 32 will now be described in detail, as this determination in effect determines the ultimate cell rate for each of the ABR channels being handled by scheduler 14.

While multiplexer control function 33 is illustrated in FIG. 3 as separate circuitry, it is also contemplated that multiplexer control function 33 may be implemented within source behavior processor 24 in cooperation with due comparator 40 and heap sort state machine 36, if desired.

In any case, because fixed bit rate (CBR) service requires communication at a guaranteed, fixed, bit rate, the ACR value for ATM cells associated with CBR channels may not vary; ABR channels, on the other hand, have their ACR values set according to the available bandwidth. According to the preferred embodiment of the invention, CBR channels are handled solely by SAR device 12, and their scheduling does not involve the operation of scheduler 14; scheduler 14 only schedules cells for ABR channels, and such cells are only transmitted by SAR device 12 on a time-available basis.

According to the preferred embodiment of the invention, however, it has been observed that an issue of "fairness" may arise when high data rate channels (e.g., CBR channels or other activity) pre-empt lower data rate channels that have become due. The control of multiplexer 32 carried out in base selection process 66 according to the preferred embodiment of the invention ensures fairness in the assignment of timestamp values so that, in an overscheduled condition, the lower data rate channels are not pre-empted while the high data-rate ABR channels fairly divide the remaining bandwidth. The general result of process 66 will now be described, with the detailed description of process 66 as carried out in scheduler 14 according to the preferred embodiment of the invention to follow.

In general, the bandwidth available to ABR transmission is essentially divided by the number of ABR channels, to derive an equally divided bit rate per channel. If this equally divided bit rate is sufficient to fully satisfy the demand of any ABR channel (which may be true for one or more relatively low bit rate ABR channels), these satisfied channels have their ACR values essentially set to their demanded bit rate, and are removed from further consideration. The remaining bandwidth (now after subtraction of both the CBR demand and also that of the fully satisfied ABR channels) is again divided by the number of ABR channels that have not yet been satisfied, any now-satisfied channels are then again allocated a bit rate and eliminated from consideration, and the process is repeated.

Upon none of the remaining ABR channels being satisfied by the division of the remaining bandwidth, the equally divided bit rate then serves as the ACR values for each of these remaining ABR channels. Of course, if all channels are satisfied at this point (i.e., there are no remaining channels), this condition corresponds to an underdemand condition, in which case all ABR channels receive an ACR corresponding to their demanded bit rate. If at least one ABR channel is not fully satisfied, however, the equally divided bit rate then provides a reasonably fair division of the bandwidth for these channels.

An example of the operation of this division of the ABR bandwidth will now be provided, to assist in the explanation of this operation. In this example, an overscheduled condition exists as follows:

| Channel | Type | % of BW demanded |
| --- | --- | --- |
| CH1 | CBR | 25% |
| CH2 | CBR | 25% |
| CH3 | ABR | 5% |
| CH4 | ABR | 10% |
| CH5 | ABR | 25% |
| CH6 | ABR | 200% |

In this example, the bandwidth is massively overscheduled, as the sum of the bit rate demands of all channels CH1 through CH6 amounts to 290% of the total bandwidth. Accordingly, the ACRs for all channels may not be set simply to their demanded bit rates.

According to the foregoing description, the 50% of the bandwidth demanded by CBR channels CH1 and CH2 from the available bandwidth is subtracted from the overall bandwidth, and the demanded 25% CBR values are assigned to channels CH1, CH2. The remaining bandwidth (50% of the overall bandwidth) is then divided by four, as four ABR channels CH3 through CH6 remain to be processed, resulting in an equally divided bit rate value Q of 12.5% of the overall bandwidth. This 12.5% rate satisfies two of the ABR channels, namely channels CH3, CH4, in which case the ACR value of 5% of the overall bandwidth is assigned to channel CH3, and the ACR value of 10% of the overall bandwidth is assigned to channel CH4. The remaining bandwidth (35% of the overall bandwidth) is then again divided by the remaining number of ABR channels under consideration (two), resulting in a new equally divided bit rate of 17.5% of the overall bandwidth. As this second equally divided bit rate satisfies the demand of neither of the remaining ABR channels CH5, CH6, and as such the ACR values for these channels are both set to this equally divided bit rate of 17.5%. The desired result in this example is thus as follows:

| Channel | Type | % of BW demanded | ACR value |
| --- | --- | --- | --- |
| CH1 | CBR | 25% | 25% |
| CH2 | CBR | 25% | 25% |
| CH3 | ABR | 5% | 5% |
| CH4 | ABR | 10% | 10% |
| CH5 | ABR | 25% | 17.5% |
| CH6 | ABR | 200% | 17.5% |

This arrangement establishes the ACR values in a relatively fair manner, such that CBR channels (which generally pay premium tariffs) and those ABR channels requesting relatively low bit rates are satisfied, while those ABR channels that request inordinate amounts of the available bandwidth (but not at the premium tariff) are served to the extent provided by the available bandwidth. Additionally, this process eliminates any incentive for channels to overspecify their desired bandwidth; for example, channel CH6 with a 200% of available bandwidth demand receives no more bandwidth than does channel CH5 with a more modest 25% of bandwidth request.

However, the above general description of the desired adjustment of the ACR rate, if it were implemented into actual circuitry, would require many machine cycles to carry out the iterative divisions and assignment operations, especially considering that up to 2048 channels may be handled by scheduler 14 in this exemplary arrangement. It has been discovered, in connection with the present invention, that the selectable use of either the previous root key value for the cell, present on lines RKEY, or the global time from reference timer 38 if the next cell for the channel is already overdue, can be used in establishing the determination of the appropriate timestamp values to accomplish the fair cell rate determination described above.

Referring now to FIG. 5 in combination with FIG. 3, the operation of multiplexer control function 33 in performing process 66 according to the preferred embodiment of the invention will now be described in detail. Process 66 begins with process 78, in which multiplexer control function 33 adds the value of the offset on lines OFFSET from floating-point-to-integer circuit 30 with the current value presented on lines RKEY by heap sort state machine 36; as noted above, this value on lines RKEY is the timestamp for the root channel for which a transmission credit was most recently issued, and which is associated with the same channel for which a new timestamp value is now being determined. As such, the value on lines RKEY corresponds to the time at which the previous cell was scheduled for transmission (which likely differs from the time at which the cell actually was transmitted, due to latency and other intervening events). The result of process 78 is future credit time FCT, which indicates a first estimate at the time (in cycles of reference timer 38) at which the next transmission credit for this channel ought to occur, using the offset provided by source behavior processor 24 and without regard for overscheduled conditions.

In decision 79, multiplexer control function 33 tests the value of future credit time FCT relative to the current global time from reference timer 38, to determine whether the new cell for the same channel that most recently received a transmission credit is already overdue. If not (decision 79 is NO; i.e., the next cell for this channel is not already overdue), control passes to process 82 in which multiplexer control function 33 selects the value on lines RKEY as the base, and forwards these lines to adder 31 for determination of the new timestamp. This situation occurs during such times as the bandwidth is not overscheduled, and as a result the next value on lines RKEY (i.e., $RKEY_{n+1}$, where the value on lines RKEY corresponding to the last transmission credit may be referred to as $RKEY_n$) corresponds to the desired ACR value for this channel. This also ensures that delays in issuing a transmit credit do not accumulate for a given channel, as may occur if the global (current) time from reference timer 38 is used as the base.

In an overscheduled condition, however, the next cell for the channel that most recently received a transmission credit may already be overdue. This condition corresponds to the future credit time FCT being less than the current global time (decision 79 is YES). In this case, control passes to process 80 in which multiplexer control function 33 selects the global time from reference timer 38 for use as the base in generating the new timestamp, and forwards this value to adder 31. The use of the global time, rather than the prior value on lines RKEY, effectively delays the timestamp for the cell, which helps to account for the overscheduled condition.

An example of the operation of the method according to the preferred embodiment of the invention in fairly scheduling ABR cells in an overscheduled condition will be described hereinbelow, after the description of the method of FIG. 4 is completed.

Referring back to FIG. 4, in process 68, the values on lines BASE and OFFSET are added by adder 31, generating a new timestamp value on lines KEY that is forwarded to heap sort state machine 36. In response to this new value on lines KEY in combination with the appropriate control signals on lines CMD from scheduler command register 26, heap sort state machine 36 executes a PUSH-POP operation. This PUSH-POP operation includes the operation pushing the current value of lines KEY associated with channel $CH_n$ into the heap for sorting in process 70, as will now be described relative to FIGS. 6a and 6b. FIGS. 6a and 6b illustrate the arrangement of on-chip parameter memory 44 and off-chip parameter memory 18, respectively, in storing channel and timestamp information, in heap fashion.

As shown in FIG. 6a, on-chip parameter memory 44 according to this preferred embodiment of the invention includes 256 forty-bit data words, associated with addresses 00 through $FF_h$. The data word associated with address 00 is reserved, and not used in this exemplary embodiment. Address 01 in on-chip parameter memory 44 is associated with the root channel which, in this embodiment of the invention, is the channel associated with the ATM cell that is next due; successive addresses in on-chip parameter memory 44 are associated with channels ordered according to their timestamp, so that address $FF_h$ is associated with the $255^{th}$ next channel coming due. Each word in onchip parameter memory 44 includes a portion for storing the timestamp and a portion for storing the channel number.

As evident from FIG. 6b, off-chip parameter memory 18 is somewhat differently arranged. In this example, the lowest address portion of off-chip parameter memory 18 is associated with the next channel in the order of coming due, after the 255 channels stored in on-chip parameter memory 44, with the remaining channels having parameters stored in off-chip parameter memory 18 in an ordered fashion. In off-chip parameter memory 18, each channel has a portion for storing many of its state parameters associated with ATM transmission, followed by a thirty-two bit word for storing its timestamp, which is followed by a word for storing the channel number. A reserved word is retained between channel entries in off-chip parameter memory 18. Additionally, off-chip parameter memory 18 also stores parameters associated with those channels for which timestamps are stored in on-chip parameter memory 44, as these ATM parameters are not stored in on-chip parameter memory 44.

Referring back to FIGS. 3 and 4, once heap sort state machine 36 pushes the channel number (from scheduler command register 28) and timestamp (on lines KEY from adder 31), heap sort process 70 is initiated. Process 70 may be performed by heap sort state machine 36 according to any one of a number of conventional heap sort algorithms, during which heap sort state machine 36 interrogates the timestamps of the current members of the heap in parameter memory 18, 44, sorts these timestamps to identify the new root timestamp and its associated channel, stores this channel into the lowest address (01) of on-chip parameter memory 44, and continues sorting the channels according to timestamp, using the new timestamp value for current channel $CH_n$, and according to a conventional heap sort algorithm. Use of the heap sort approach has been found to be particularly beneficial in connection with the present invention, as the heap sort technique is well-suited to rapidly finding the lowest value of a parameter (i.e., the root) even where the number of elements to be sorted is quite large, as in this case (e.g., 2048 channel timestamp values).

According to the preferred embodiment of the invention, heap sort process 70 first identifies the new root channel in the heap. Particularly in effecting the fair allocation of bandwidth in the overscheduled condition according to the present invention, in the event that the new heap entry has the same timestamp as a previously scheduled entry, the new heap entry will be placed into the heap behind the previously placed entry. The effect of this determination will become apparent hereinbelow.

Once the identification of the new root channel in the heap occurs, heap sort state machine 36 performs process 72 to forward the channel number of this new root channel (CH$_m$) to scheduler output register 42, to forward the timestamp of this new root channel CH$_m$ to due comparator 40 on lines RKEY, and to drive active a control signal on line VALID to due comparator 40 and to scheduler output register 42 to set the valid bit therein. According to the preferred embodiment of the invention, the root channel always gets a transmission credit, no matter how old its timestamp value becomes; in an overscheduled situation, the timestamp of the root channel may be significantly "older" (i.e., less than) the global time presented by reference timer 38. The heap sort process 70 then can continue to sort the remaining active channels, in parallel with the processing of the new root channel CH$_m$. In the completion of sort process 70, those channels having smaller timestamp values have their entries stored into on-chip parameter memory 44, while those with larger (i.e., later) timestamp values have their associated entries stored into external parameter memory 18. Control line SORT-BUSY to scheduler output register 42 is held active during this time.

Source behavior processor 24 notices that the valid bit in scheduler output register 42 is set by process 72, during its execution of decision 53 (in a looping manner). Once this result is found (decision 53 is YES), source behavior processor 24 performs process 56 to begin reading channel state information for channel CH$_m$ from parameter memory 18, as needed to properly issue a transmit credit and schedule transmission of an ATM cell therefor. After retrieving these parameters, source behavior processor 24 performs decision 57 to poll scheduler output register 42 to see if channel CH$_m$ has yet come due; if not (decision 57 is NO), source behavior processor 24 performs wait 58, and repeats decision 57.

Meanwhile, once due comparator 40 receives an active signal on line VALID from heap sort state machine 36, due comparator 40 begins executing decision 73 to determine if channel CH$_m$ has yet come due. Decision 73, in its simplest form, is a simple comparison of the timestamp associated with channel CH$_m$ (and communicated on lines RKEY from heap sort state machine 36) with the global time value communicated from reference timer 38. If the global time value has not yet reached the timestamp value for the root channel CH$_m$ (decision 73 returns NO), due comparator 40 waits for an additional cycle of the clock signal on line CLK in process 74, and repeats decision 73. At such time as the global time value is at or beyond the timestamp on lines RKEY (decision 73 is YES), due comparator 40 issues a due signal to scheduler output register 42 on line DUE, in process 76.

However, according to the preferred embodiment of the invention, reference timer 38 is a simple counter which advances with each cycle of the clock signal on line CLK, and wraps around once reaching a filled state. As such, if due comparator 40 performs only a simple comparison of the value of the timestamp on lines RKEY with the output of reference timer 38, channel CH$_m$ may become due but may not be noticed if reference timer 38 has wrapped around back to zero. It has been discovered, in connection with the present invention, that selection of the word width of the output from reference timer relative to the width of the timestamp on lines RKEY and to the width of the offset portion on lines OFFSET can avoid many indeterminate situations resulting from wraparound.

According to the preferred embodiment of the invention, the word width of the timestamp on lines RKEY is selected to have one additional bit, at the most significant bit portion, beyond the word width at the output of reference timer 38. In the example of FIG. 3, reference timer 38 presents an output that is k bits wide, while lines RKEY number k+1. This relationship permits the range of timestamp values to double the range of reference timer outputs. For example, referring to clock time, the timestamp on lines RKEY may be considered as a twenty-four hour clock value (e.g., 13:30 represents 1:30 p.m.), while the output of reference timer 38 corresponds to a twelve-hour clock value. As such, the wrapping around at the output of reference timer 38 can be readily considered in the comparison performed by due comparator 40.

Secondly, the word width at the output of reference timer 38 is selected to be one bit wider than the offset on lines OFFSET (k−1 in this example). This ensures that a channel can be scheduled no more than one-half of the range of reference timer 38 different from the value of reference timer 38. Due comparator 40 can therefore look backwards only one half of the range of reference timer 38, from the current global time. This consideration is used in combination with the feature that heap sort state machine 36 performs its sort of timestamps without the most significant timestamp bit when the reference timer 38 outputs a value in the first half of its range (i.e., MSB=0), but using the most significant timestamp bit when the reference timer is in the second half of its range (i.e., MSB=1). Since each of the timestamps are sorted by heap sort state machine 36 upon the completion of each cell processing, these considerations ensure that wraparounds of reference timer 38 do not return an erroneous result.

As a result of these operations, the operation of due comparator 40 can reliably compare the k-bit value at the output of reference timer 38 with the k+1 bits of the timestamp of root channel CH$_m$ on lines RKEY. Upon decision 73 determining that root channel CH$_m$ is due (decision 73 is YES), due comparator 40 issues an active signal on line DUE to scheduler output register 42, setting a bit therein which is then interrogated by source behavior processor 24 in its next pass through decision 57. In response to detecting that the DUE signal for channel CH$_m$ has been issued (decision 57 is YES), source behavior processor 24 issues a transmit credit for channel CH$_m$, in process 60, forwarding the channel identifier for channel CH$_m$ along with its ATM transmission parameters retrieved in process 56, to SAR device 12 in the conventional manner.

Following process 60 in which source behavior processor 24 issues the transmit credit for channel CH$_m$, the process repeats itself, beginning with process 48 in which source behavior processor 24 retrieves and updates, if necessary, the ACR value for channel CH$_m$. The process then repeats itself, upon completion of the heap sort by heap sort state machine 36 in process 77 and the associated clearing of control line SORTBUSY, which permits decision 49 to pass control to process 52 again.

Once the transfer credit is issued by source behavior processor 24, as noted above, source behavior processor 24 sets an indication that may be polled by SAR device 12 when a transmission opportunity for an ABR cell arises. For example, source behavior processor 24 preferably includes a "next cell register" which contains the issued transmission credit, associated with the cell for which transmission is to occur. Upon a transmission opportunity for an ABR channel being detected by SAR device 12, SAR device 12 can poll this next cell register to determine if an ABR cell is scheduled for transmission by scheduler 14, and if so, SAR device 12 can effect transmission of this cell according to the ATM protocol. Of course, if no transmission opportunity presents itself (e.g., all of the available bandwidth is occupied by CBR channels), this state of scheduler 14 will remain for some time.

As noted above, the selection of the appropriate base value for determination of the timestamp, according to the preferred embodiment of the invention, permits the fair allocation of bandwidth in an overscheduled condition. In summary, this fair allocation of bandwidth results from the enforcement of three rules, namely:

1) "Overdue" transmissions, defined as a channel having a timestamp with an older (i.e., lesser) value than the current global time, are never dropped. The root channel always gets the transmission credit, regardless of the age of its timestamp value;
2) Sorting of the heap data structure is performed in such a manner that a newer channel (i.e., more recently PUSHed onto the heap) with the same timestamp value as an older channel (i.e., PUSHed onto the heap earlier) is placed into the heap behind the older channel; and
3) The effective cell transmission rate is reduced, from the ACR value upon which the offset value is based for calculation of the timestamp value, by the selection of the base with which the offset value is summed to derive the new timestamp value, such selection being carried out so as to carry forward any timestamp which would already be overdue when generated.

These rules, which were noted hereinabove relative to the operation of the method of FIGS. 4 and 5, result in a fair allocation of bandwidth even in an overscheduled condition. This result will now be described by way of an example in which three ABR channels CH1, CH2, CH3 are in an overscheduled condition, for a system in which a new cell may be issued a transmission credit as fast as every 100 clock cycles. In this example, channel CH1 is demanding 100% of the bandwidth for its cell rate which, in this example, corresponds to a timestamp offset of 100 clock cycles; channel CH2 demands 200% of the bandwidth, which corresponds to an offset of 50 clock cycles (twice as fast as the 100 cycle rate); and channel CH3 demands only 20% of the line rate, and as such its timestamp offset is 500 cycles (five times as slow as the 100 cycle rate).

The following table illustrates the operation of scheduler 14 according to the preferred embodiment of the invention:

| GT | Root channel | Root timestamp | Credit channel | CH1 timestamp | CH2 timestamp | CH3 timestamp |
|---|---|---|---|---|---|---|
| 0 | — | — | — | 100 | — | — |
| 5 | CH1 | 100 | — | 100 | 50 | — |
| 10 | CH2 | 50 | — | 100 | 50 | 500 |
| 50 | CH2 | 50 | CH2 | 100 | 50 + 50 = 100 | 500 |
| 150 | CH1 | 100 | CH1 | 100 + 100 = 200 | 100 | 500 |
| 250 | CH2 | 100 | CH2 | 200 | 100 + 50 = 150 → 300 | 500 |
| 350 | CH1 | 200 | CH1 | 200 + 100 = 300 → 450 | 300 | 500 |
| 450 | CH2 | 300 | CH2 | 450 | 300 + 50 = 350 → 500 | 500 |
| 550 | CH1 | 450 | CH1 | 450 + 100 = 550 | 500 | 500 |
| 650 | CH3 | 500 | CH3 | 550 | 500 | 500 + 500 = 1000 |
| 750 | CH2 | 500 | CH2 | 550 | 500 + 50 = 550 → 800 | 1000 |
| 850 | CH1 | 550 | CH1 | 550 + 100 = 650 → 950 | 800 | 1000 |
| 950 | CH2 | 800 | CH2 | 950 | 800 + 50 = 850 → 1000 | 1000 |
| 1050 | CH1 | 950 | CH1 | 950 + 100 = 1050 | 1000 | 1000 |
| 1150 | CH3 | 1000 | CH3 | 1050 | 1000 | 1000 + 500 = 1500 |
| 1250 | CH2 | 1000 | CH2 | 1050 | 1000 + 50 = 1050 → 1300 | 1500 |
| 1350 | CH1 | 1050 | CH1 | 1050 + 100 = 1150 → 1450 | 1300 | 1500 |
| 1450 | CH2 | 1300 | CH2 | 1450 | 1300 + 50 = 1350 → 1500 | 1500 |
| 1550 | CH1 | 1450 | CH1 | 1450 + 100 = 1550 | 1500 | 1500 |

Referring to the above example, global time values (GT) are illustrated as beginning from GT=0 (in numbers of clock cycles). Until GT=50, the operations simply set up channels CH1 through CH3, with no transmission credits yet being issued; in this example, cells receive transmission credits no more frequently than 100 clock cycles, as noted above. At GT=0, channel CH1 receives its first timestamp which, in this example is 100 (the base being zero during setup). At GT=5, channel CH2 receives its first timestamp which, in this example, is 50 (again, the base is zero during setup in this example); the current root channel at GT=5 is channel CH1, with a timestamp of 100, as this channel is the only channel with a timestamp (and thus has the lowest timestamp value). Similarly, at GT=10, channel CH3 receives its timestamp of 500; the root channel at this time is CH2, since its timestamp value of 50 is the lowest. As such, in this example, each channel CH1, CH2, CH3 receives an initial timestamp equal to their respective offsets corresponding to the desired ACR. No transmission credits are issued at GT=0, GT=5, GT=10, as none of the timestamps have yet come due (the root timestamp is greater than the global time in each of these cases).

At GT=50, root channel CH2 becomes due, as its timestamp equals the global time. As such, channel CH2 receives a transmission credit at GT=50, and it also receives a new timestamp. Referring back to FIG. 5, process 66 must be performed to determine the correct base in generating the new timestamp. First, process 78 determines the future credit time FCT as the sum of the last timestamp value plus the offset; in this case, the sum is 100 (50+50). Since this future credit time FCT is not less than the current global time, the prior timestamp value is used as the base in generating the new timestamp of 100 (50+50), as shown in the table (of course, use of the global time GT would give the same result in this case). At GT=150, which is the next instance at which a transmission credit can come due, the root channel is channel CH1, with a timestamp of 100; while channel CH2 also has a timestamp of 100 as determined at GT=50, channel CH1 is the root because the more newly ordered channel with the same timestamp is placed behind previously ordered channels, as discussed above. At GT=150, therefore, channel CH1 receives a transmission credit, and a new timestamp of 200 (using the prior timestamp of 100 plus the offset of 100 for channel CH1, which is greater than global time GT=150, and thus causing the prior timestamp of 100 to be used as the base).

At GT=250, root channel CH2 comes due, having a timestamp of 100, and receives a transmission credit. At this time, channel CH2 receives a new timestamp. As described above, the base must first be selected. In this instance, process 78 first determines the future credit time FCT as 150 (100+50). Since this future credit time FCT is less than the current global time (GT=250), the global time GT is used as the base in generating the new timestamp of 300 (250+50), as shown in the table.

Operation of the issuance of transmission credits and deriving of new timestamp values continues every 100 clock cycles in this manner, giving the results illustrated in the table. As indicated therein, for example, at GT=650, channel CH3 becomes the root channel and is due, since its timestamp value at that time (500) was ordered prior than the timestamp for channel CH2 (generated later, at GT=450).

One can readily determine the fairness of the method of operation according to the preferred embodiment of the invention by considering the "Credit channel" column of the table over time. As is evident from the table, the channels credited over time (beginning at GT=250, after the initial transient) follow a repeating sequence of (CH2, CH1, CH2, CH1, CH3). According to this sequence, channel CH3 receives a transmission credit every fifth time, which amounts to 20% of the line rate and thus to the demanded line rate of channel CH3. The other channels CH1, CH2 cannot be satisfied by the available bandwidth (demanding 100% and 200% of the line rate, respectively), and as such these channels split the remaining line rate after considering channel CH3, each of channels CH1, CH2 receiving 40% of the available bandwidth. The fairness of this approach, which follows the general description provided hereinabove, will be evident to those of ordinary skill in the art.

According to the preferred embodiment of the present invention, therefore, the scheduling of ATM transmission as executed by scheduler 14 in combination with SAR device 12 provides important advantages in executing ATM communication. First, the present invention provides an efficient and fair way of scheduling Available Bit Rate (ABR) Asynchronous Transfer Mode (ATM) transmissions. For example, one implementation of the preferred embodiment of the invention has been observed to easily meet the 155 Mbits line rate available with modern fiber optic facilities, in a manner that is fully compliant with industry specifications. Secondly, the use of the heap storage technique greatly reduces the memory resources that would otherwise be required by providing a counter for each of the possible channels to be handled.

Furthermore, the scheduling function provided by the preferred embodiment of the invention provides a high degree of scalability by its utilization of on-chip parameter memory for those channels that are soon to come due, in combination with off-chip parameter memory for later-to-be-scheduled channels; as a result, the addition of channels can be easily effected simply by expanding the size of off-chip parameter memory. Still furthermore, the present invention implements the scheduling of ATM cells in such a manner that delays in the actual scheduling of a cell for a channel do not accumulate over multiple cells for that same channel.

In addition, the preferred embodiment of the present invention includes a fair manner in which to assign allowed cell rates for ABR channels, considering the demand from many ABR channels and also considering fixed bit rate channels such as Constant Bit Rate channels, especially where the desired transmission capacity exceeds the bandwidth of the communications facility. This fairness is obtained in an extremely cycle-efficient manner, through the selection of the base value to be added to the ACR offset requested for each channel, and in a manner that is not considered in the flow control algorithms executed in conventional ATM networks.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A method of scheduling the transmission of packet cells associated with a plurality of communications channels, comprising the steps of:

sorting channel entries in a heap memory, each channel entry comprising a timestamp value associated with each channel, the timestamp value indicating a time at which the transmission of a cell for the associated channel is next due, the sorting step identifying a root channel entry corresponding to the next due channel;

comparing the timestamp value of the root channel entry to a global time generated by a reference timer; and responsive to the comparing step determining that the global time has at least reached the timestamp value of the root channel entry, issuing a transmit credit for the channel associated with the root channel entry.

2. The method of claim 1, further comprising:

after the step of issuing a transmit credit, retrieving an allowed cell rate value from a parameter memory for the channel associated with the root channel entry;

deriving a new timestamp value for the channel associated with the root channel entry; and then repeating the sorting, comparing, and issuing steps.

3. A method of scheduling the transmission of packet cells associated with a plurality of communications channels, comprising the steps of:

sorting channel entries in a heap memory, each channel entry comprising a timestamp value associated with each channel, the timestamp value indicating a time at which the transmission of a cell for the associated channel is next due, the sorting step identifying a root channel entry corresponding to the next due channel;

comparing the timestamp value of the root channel entry to a global time generated by a reference timer; and responsive to the comparing step determining that the global time has at least reached the timestamp value of the root channel entry, issuing a transmit credit for the channel associated with the root channel entry;

after the step of issuing a transmit credit, retrieving an allowed cell rate value from a parameter memory for the channel associated with the root channel entry;

deriving a new timestamp value for the channel associated with the root channel entry, the deriving step comprising:
  generating an offset timestamp value based upon a scheduler clock frequency divided by the allowed cell rate value;
  adding the offset timestamp value to a base timestamp value to produce the new timestamp value; and
after the deriving step, repeating the sorting, comparing, and issuing steps.

4. The method of claim 3, wherein the base timestamp value equals the timestamp value of the root channel entry.

5. The method of claim 3, wherein the base timestamp value equals the global time.

6. The method of claim 1, wherein the sorting step comprises:
  identifying first and second groups of the plurality of channels, the first group of the plurality of channels having timestamp values that are nearer due than the timestamp values of the second group of the plurality of channels;
  storing channel entries for the first group of the plurality of channels in a first parameter memory; and
  storing channel entries for the second group of the plurality of channels in a second parameter memory.

7. A method of scheduling the transmission of packet cells associated with a plurality of communications channels, comprising the steps of:
  sorting channel entries in a heap memory, the sorting step performed by circuitry in a scheduler integrated circuit, each channel entry comprising a timestamp value associated with each channel, the timestamp value indicating a time at which the transmission of a cell for the associated channel is next due, the sorting step identifying a root channel entry corresponding to the next due channel, and the sorting step comprising:
    identifying first and second groups of the plurality of channels, the first group of the plurality of channels having timestamp values that are nearer due than the timestamp values of the second group of the plurality of channels;
    storing channel entries for the first group of the plurality of channels in a first parameter memory implemented in the scheduler integrated circuit; and
    storing channel entries for the second group of the plurality of channels in a second parameter memory implemented into memory external to the scheduler integrated circuit;
  comparing the timestamp value of the root channel entry to a global time generated by a reference timer; and
  responsive to the comparing step determining that the global time has at least reached the timestamp value of the root channel entry, issuing a transmit credit for the channel associated with the root channel entry.

8. The method of claim 1, further comprising:
  after the step of issuing a transmit credit, retrieving an allowed cell rate value for the one of the plurality of channels associated with the root channel entry;
  deriving a new timestamp value for the channel associated with the root channel entry; and
  then repeating the sorting, comparing, and issuing steps.

9. A method of scheduling the transmission of packet cells associated with a plurality of communications channels, comprising the steps of:
  sorting channel entries in a heap memory, each channel entry comprising a timestamp value associated with each channel, the timestamp value indicating a time at which the transmission of a cell for the associated channel is next due, the sorting step identifying a root channel entry corresponding to the next due channel;
  comparing the timestamp value of the root channel entry to a global time generated by a reference timer; and
  responsive to the comparing step determining that the global time has at least reached the timestamp value of the root channel entry, issuing a transmit credit for the channel associated with the root channel entry;
  after the step of issuing a transmit credit, retrieving an allowed cell rate value for the one of the plurality of channels associated with the root channel entry;
  deriving a new timestamp value for the channel associated with the root channel entry, the deriving step comprising:
    generating an offset timestamp value based upon a scheduler clock frequency divided by the allowed cell rate value;
    adding the timestamp value for the channel associated with the root channel entry to the offset timestamp value to derive a future credit time value;
    comparing the future credit time value with the global time;
    responsive to the comparing step determining that the future credit time value is later than the global time, setting the new timestamp value to the future credit time value; and
    responsive to the comparing step determining that the future credit time value is earlier than the global time, adding the offset timestamp value to the global time to generate the new timestamp value; and
  after the deriving step, repeating the sorting, comparing, and issuing steps.

10. A network hub and ATM translator system, comprising:
  a host controller, having an interface for receiving local communications; and
  an ATM translator subsystem, comprising:
    a transceiver interface, coupled to a high data rate communications facility;
    segmentation and reassembly circuitry, coupled to the transceiver interface and to the host controller;
    parameter memory, for storing entries associated with each of a plurality of ATM communications channels; and
    a scheduler, coupled to the parameter memory and to the segmentation and reassembly processor, for scheduling the transmission of packet cells associated with the plurality of ATM communications channels by a sequence of operations, the scheduler comprising:
      heap sort circuitry for sorting channel entries in the parameter memory, each channel entry comprising a timestamp value associated with each channel, the timestamp value indicating a time at which the transmission of a cell for the associated channel is next due, and for identifying a root channel entry corresponding to the next due channel;
      a reference timer for generating a global time;
      a comparator for comparing the timestamp value of the root channel entry to the global time; and
      source behavior processor circuitry, coupled to the segmentation and reassembly circuitry issuing a transmit credit for the channel associated with the root channel entry.

11. The system of claim 10, wherein the scheduler is integrated into a single integrated circuit.

12. The system of claim 11, wherein the scheduler further comprises:
- on-chip parameter memory implemented into the same integrated circuit with the scheduler, for storing timestamp values associated with a first group of the plurality of channels;
- wherein the parameter memory is external to the scheduler integrated circuit, and is for storing timestamp values associated with a second group of the plurality of channels, the first group of the plurality of channels having timestamp values that are nearer due than the timestamp values of the second group of the plurality of channels.

13. The system of claim 10, wherein the source behavior processor circuitry is also for retrieving an allowed cell rate value from a parameter memory for the channel associated with the root channel entry after issuing a transmit credit and wherein the scheduler further comprises:
- circuitry, coupled to the heap sort circuitry, for deriving a new timestamp value for the channel associated with the root channel entry.

14. The system of claim 10, wherein the deriving circuitry comprises:
- a divider for generating an offset timestamp value based upon a scheduler clock frequency divided by the allowed cell rate value; and
- an adder for adding the offset timestamp value to a base timestamp value to produce the new timestamp value.

15. The system of claim 14, wherein the base timestamp value equals the timestamp value of the root channel entry.

16. The system of claim 14, wherein the deriving circuitry further comprises:
- a multiplexer, having a first input for receiving the global time from the reference timer, having a second input for receiving the timestamp value of the root channel entry, having an output coupled to the adder to communicate the base timestamp value thereto, and having a control input for selecting either the global time or the timestamp value of the root channel entry for the base timestamp value; and
- a multiplexer control function, for generating a select signal applied to the control input of the multiplexer, by performing the operations of:
  - generating an offset timestamp value based upon a scheduler clock frequency divided by the allowed cell rate value;
  - adding the timestamp value for the channel associated with the root channel entry to the offset timestamp value to derive a future credit time value;
  - comparing the future credit time value with the global time; and
  - responsive to the comparing step determining that the future credit time value is later than the global time, setting the new timestamp value to the future credit time value; and
  - responsive to the comparing step determining that the future credit time value is earlier than the global time, adding the offset timestamp value to the global time to generate the new timestamp value.

* * * * *